US012552649B2

(12) United States Patent
Omori

(10) Patent No.: US 12,552,649 B2
(45) Date of Patent: Feb. 17, 2026

(54) TRANSPORT APPARATUS AND METHOD OF ADJUSTING TRANSPORT APPARATUS

(71) Applicant: Daifuku Co., Ltd., Osaka (JP)

(72) Inventor: Kazuya Omori, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 18/927,628

(22) Filed: Oct. 25, 2024

(65) Prior Publication Data

US 2025/0136421 A1 May 1, 2025

(30) Foreign Application Priority Data

Nov. 1, 2023 (JP) ................................ 2023-187991

(51) Int. Cl.
*B66F 9/07* (2006.01)
*B66F 9/20* (2006.01)

(52) U.S. Cl.
CPC . *B66F 9/07* (2013.01); *B66F 9/20* (2013.01)

(58) Field of Classification Search
CPC ............... B66F 9/07; B66F 9/20; B66F 9/072
See application file for complete search history.

(56) References Cited

U.S. PATENT DOCUMENTS 2,599,052 A * 6/1952 Forman .................. A61G 19/00 187/244
3,332,665 A * 7/1967 Bruns ...................... B66D 3/06 254/416
4,108,280 A * 8/1978 Eastcott ................... B66D 5/14 187/256
5,036,563 A * 8/1991 Liebing ................. B66B 7/1284 198/496
6,405,833 B1 * 6/2002 Baranda ................... B66D 3/08 474/151
6,601,828 B2 * 8/2003 Strbuncelj ............. B66B 11/043 187/254
6,663,086 B2 * 12/2003 Huang ..................... B66D 1/22 254/344
7,090,055 B1 * 8/2006 McLaughlin ............ B66D 5/12 254/366
7,165,653 B2 * 1/2007 Rennetaud .......... B66B 11/0438 310/90
7,954,602 B2 * 6/2011 Stanislao .............. B66B 9/0853 414/921

(Continued)

FOREIGN PATENT DOCUMENTS

JP 5983752 B2 * 9/2016 ........... B65G 1/0407

*Primary Examiner* — Michael A Riegelman
(74) *Attorney, Agent, or Firm* — Kaplan Breyer Schwarz, LLP

(57) ABSTRACT

A transport apparatus includes a support; an elevating base supported in the support to be movable up and down; a belt stretched from the elevating base; a pulley wrapped with the belt; a shaft fitting into the pulley; a fixing member disposed on each side of the pulley in an axial direction of the shaft; a pair of bearings that rotatably hold the shaft in the fixing member; a cylindrical member fitting around the shaft; and an annular member including a ring opening portion to fit onto and be removed from the shaft. The position of the pulley between the pair of bearings in the axial direction of the shaft is determined by the cylindrical member and the annular member.

5 Claims, 5 Drawing Sheets

(56) References Cited

U.S. PATENT DOCUMENTS

| | | | | |
|---|---|---|---|---|
| 8,960,418 | B2 * | 2/2015 | Rathmann | H02K 7/1008 198/835 |
| 10,046,949 | B2 * | 8/2018 | Moser | B66B 15/02 |
| 10,207,899 | B2 * | 2/2019 | Fauconnet | B66B 11/0035 |
| 10,246,303 | B2 * | 4/2019 | Lampinen | B66B 15/02 |
| 10,556,777 | B2 * | 2/2020 | Salmi | B66B 15/02 |
| 2006/0102433 | A1 * | 5/2006 | Ueda | B66F 9/072 187/238 |
| 2011/0139549 | A1 * | 6/2011 | Bacon | B66D 1/02 187/269 |
| 2012/0168255 | A1 * | 7/2012 | Iwata | B65G 1/0407 187/244 |
| 2015/0210519 | A1 * | 7/2015 | Koyama | B66F 9/07 105/26.05 |
| 2015/0225216 | A1 * | 8/2015 | Koyama | B66F 9/072 187/244 |
| 2015/0225217 | A1 * | 8/2015 | Koyama | B61B 13/06 187/244 |
| 2015/0225220 | A1 * | 8/2015 | Koyama | B65G 1/0407 187/266 |
| 2015/0353325 | A1 * | 12/2015 | Vincent | H02K 7/1008 310/68 B |
| 2018/0334361 | A1 * | 11/2018 | Fauconnet | B66B 11/0035 |
| 2024/0375880 | A1 * | 11/2024 | Kronholz | B65G 17/485 |
| 2025/0136421 | A1 * | 5/2025 | Omori | B66F 9/20 |

* cited by examiner

TRANSPORT APPARATUS AND METHOD OF ADJUSTING TRANSPORT APPARATUS

CROSS-REFERENCE TO RELATED APPLICATIONS

This application is based on and claims priority from Japanese Patent Application No. 2023-187991, filed on Nov. 1, 2023, with the Japan Patent Office, the disclosure of which is incorporated herein in its entirety by reference.

TECHNICAL FIELD

The present disclosure relates to a transport apparatus and a method of adjusting the transport apparatus.

BACKGROUND

Japanese Patent No. 5983752 discloses a transport apparatus such as a stacker crane, which loads and transports articles on an elevating base that moves up and down along a mast (pillar). In the stacker crane, an elevation drive mechanism for moving the elevating base up and down includes a driving pulley that moves a suspension belt forwardly and reversely by a driving force from an elevation drive motor.

SUMMARY

An aspect of the present disclosure provides a transport apparatus including: a support; an elevating base supported in the support to be movable up and down; a belt that is stretched from the elevating base and moves the elevating base up and down; a pulley wrapped with the belt; a shaft fitting into the pulley; a fixing member disposed on each side of the pulley in an axial direction of the shaft; a pair of bearing units that rotatably hold the shaft in the fixing member; a cylindrical member fitting around the shaft, and disposed between each of the pair of bearing units and the pulley; and an annular member including a ring opening portion to fit onto and be removed from the shaft, and fitting around the shaft between each of the pair of bearing units and the pulley. The position of the pulley between the pair of bearing units in the axial direction of the shaft is determined by the cylindrical member and the annular member.

Another aspect of the present disclosure provides a method of adjusting a transport apparatus including: a support; an elevating base supported in the support to be movable up and down; a belt that is stretched from the elevating base and moves the elevating base up and down; a pulley wrapped with the belt; a shaft fitting into the pulley; a fixing member disposed on each side of the pulley in an axial direction of the shaft; a pair of bearing units that rotatably hold the shaft in the fixing member; a cylindrical member fitting around the shaft, and disposed between each of the pair of bearing units; and an annular member including a ring opening portion to fit onto and be removed from the shaft, and fitting onto the shaft between each of the pair of bearing units and the pulley. The method includes: removing a first annular member as the annular member from the shaft, without removing the pulley and the cylindrical member from the shaft; and fitting a second annular member with a different thickness from that of the first annular member, as the annular member, in place of the first annular member.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
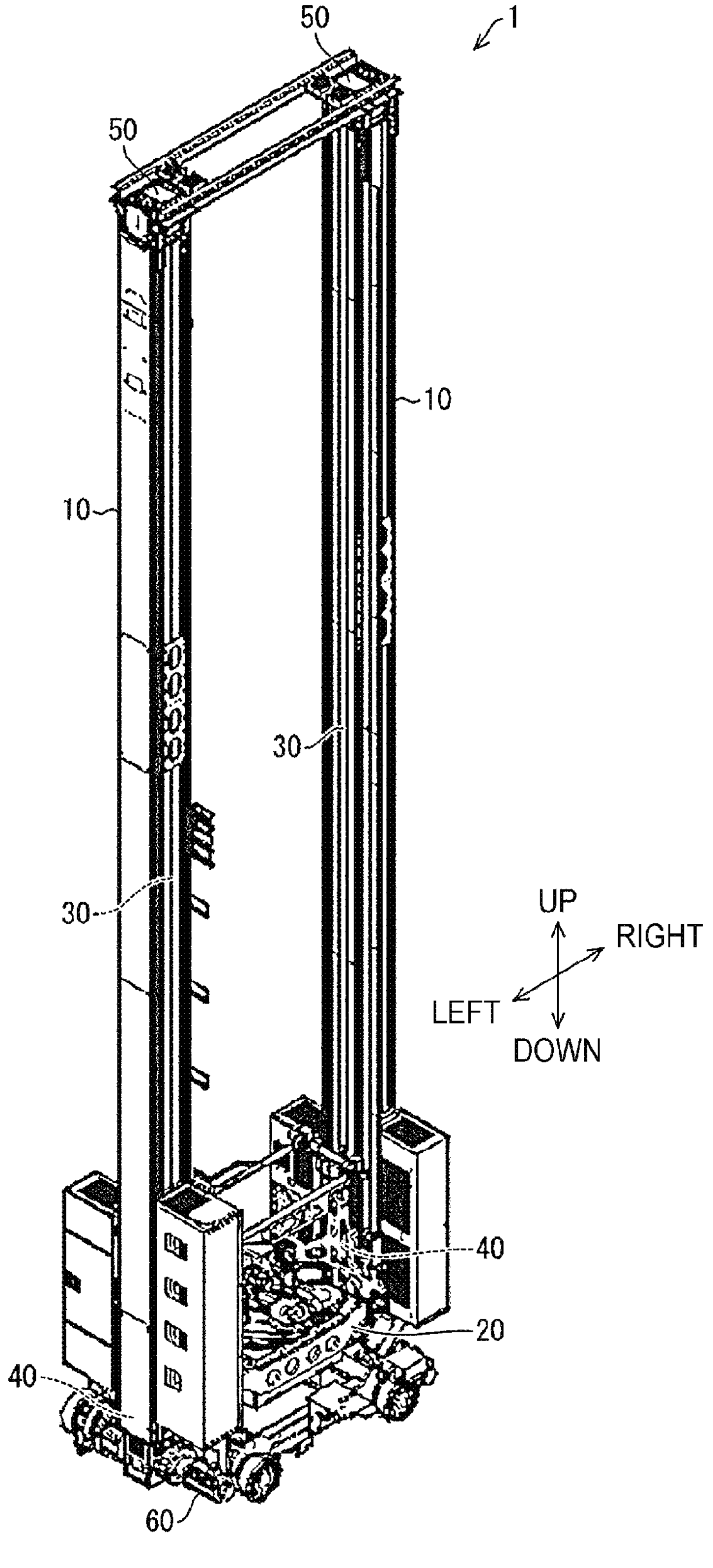
FIG. 1 is a perspective view of a transport apparatus according to an embodiment of the present disclosure.

In the following detailed description, reference is made to the accompanying drawings which form a part hereof. The illustrative embodiments described in the detailed description, drawings, and claims are not meant to be limiting. Other embodiments may be utilized, and other changes may be made without departing from the spirit or scope of the subject matter presented herein.

When fabricating the transport apparatus, a deviation may occur between the position of the driving pulley and the position of the suspension belt due to, for example, deformation of the suspension belt during the manufacturing thereof. In this case, when the belt wraps around the edge of the driving pulley, the belt is likely to be broken, and therefore, the position of the driving pulley needs to be adjusted to match the position of the belt connected to the elevating base. In the related art, in order to adjust the position of the driving pulley, the driving pulley should be removed from the elevation drive motor, which causes the problem of requiring a lot of work time.

The present disclosure implements, for example, a transport apparatus that may reduce the time required to adjust the position of the pulley.

An aspect of the present disclosure provides a transport apparatus including: a support; an elevating base supported in the support to be movable up and down; a belt that is stretched from the elevating base and moves the elevating base up and down; a pulley around which the belt wraps; a shaft fitting into the pulley; fixing flanges disposed on both sides of the pulley in an axial direction of the shaft; a pair of bearing units that rotatably hold the shaft in the fixing flanges; cylindrical collars fitting around the shaft, and disposed between one of the pair of bearing units and the pulley and between a remaining of the pair of bearing units and the pulley, respectively; and annular spacers each including ring opening portions to fit onto and be removed from the shaft, and fitting onto the shaft between one of the pair of bearing units and the pulley and between a remaining of the pair of bearing units and the pulley, respectively. The position of the pulley between the pair of bearing units in the axial direction of the shaft is adjusted by the cylindrical collars and the annular spacers.

Another aspect of the present disclosure provides a method of adjusting a transport apparatus including: a support; an elevating base supported in the support to be movable up and down; a belt that is stretched from the elevating base and moves the elevating base up and down; a pulley around which the belt wraps; a shaft fitting into the pulley; fixing flanges disposed on both sides of the pulley in an axial direction of the shaft; a pair of bearing units that rotatably hold the shaft in the fixing flanges; cylindrical collars fitting around the shaft, and disposed between one of the pair of bearing units and the pulley and between a remaining of the pair of bearing units and the pulley, respectively; and annular spacers each including ring opening portions to fit onto and be removed from the shaft, and fitting onto the shaft between one of the pair of bearing units and the pulley and between a remaining of the pair of bearing units and the pulley, respectively. The method includes: removing first annular spacers as the annular spacers from the shaft, without removing the pulley and the cylindrical collars from the shaft; and fitting second annular spacers with a different thickness from that of the first annular spacers, as the annular spacers, in place of the first annular spacers.

According to an aspect of the present disclosure, it is possible to implement, for example, a transport apparatus that may reduce the work time for adjusting the position of the pulley.

Hereinafter, an embodiment of the present disclosure is described in detail using FIGS. 1 to 4.

(Transport Apparatus)

FIG. 1 is a perspective view illustrating an outline of a transport apparatus 1. The outline of the transport apparatus 1 is described using FIG. 1.

The transport apparatus 1 transports articles. In the descriptions herein, a stacker crane is described as an example of the transport apparatus 1. However, without being limited to the stacker crane, the transport apparatus according to the present disclosure may be, for example, a lift fixed to a floor surface and provided with an elevating base on which articles are loaded. Further, the present disclosure may be applied to a transport apparatus including a hoist mechanism using pulleys and a belt, a transport vehicle (e.g., an overhead hoist transport (OHT)), and furthermore, a lifter that moves the transport vehicle up and down among rails of different floors. The transport apparatus 1 includes a mast 10 (support), a carriage 20 (elevating base), a belt 30, a driving unit 40, and a driven pulley 50.

The mast 10 is a columnar member extending in the vertical direction. In the present embodiment, two masts 10 are provided as a pair and spaced apart from each other. The number of masts 10 included in the transport apparatus 1 is not limited to one pair including two masts. The mast 10 may be provided with an elevation guide rail that guides the carriage 20.

The carriage 20 is a member on which an article to be transported by the transport apparatus 1 is placed. The carriage 20 is disposed between the pair of masts 10, and supported to be elevatable with respect to the masts 10. When the mast 10 includes the elevation guide rail, the carriage 20 moves up and down along the elevation guide rail.

The belt 30 is a member that transmits a power generated by the driving unit 40 to the carriage 20, to move the carriage 20 up and down. Two belts 30 are provided on the pair of masts 10, respectively. In each mast 10, one end of each of the two belts 30 may be fixed to the carriage 20. The other end of each of the two belts 30 may be connected to a counterweight (not illustrated) in order to take the balance of weight with respect to the carriage 20. Thus, in each mast 10, the carriage 20, the belt 30, the counterweight, and the belt 30 may be connected in an annular form.

The belt 30 is stretched without being bent between the driven pulley 50 disposed on each mast 10 and the driving unit 40 disposed below each mast 10. The belt 30 may be, for example, a toothed belt, or a belt having another shape.

(Outline of Driving Unit 40)

Figure 2:
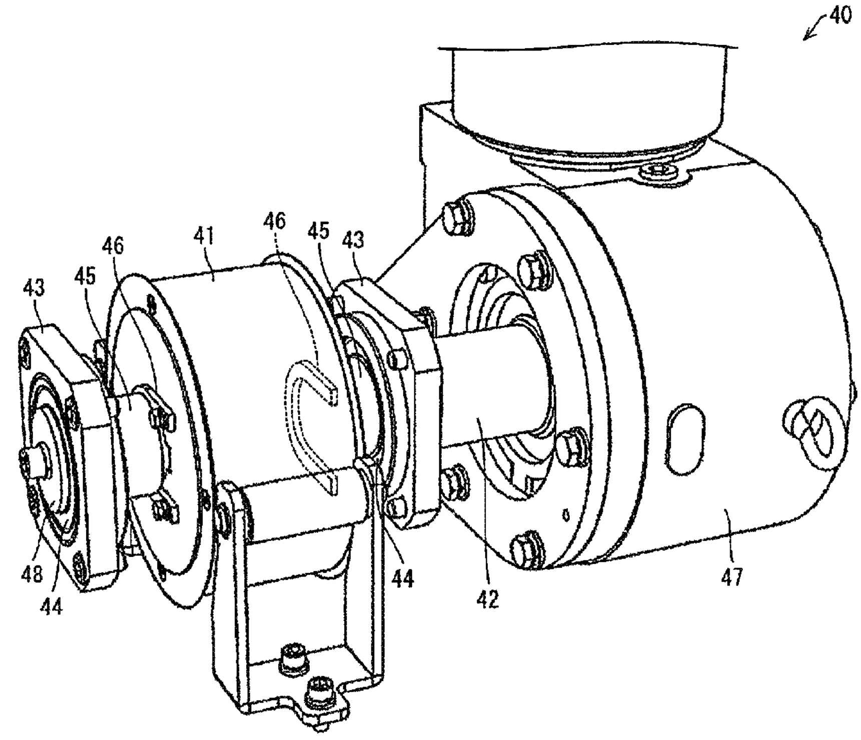
FIG. 2 is a perspective view of a driving unit according to an embodiment of the present disclosure.

FIG. 2 is a perspective view of the driving unit 40. The driving unit 40 is described using FIG. 2. The driving unit 40 moves up and down the carriage 20 via the belt 30. The driving unit 40 includes a pulley 41, a shaft 42, a flange 43 (fixing member), a bearing unit 44, a collar 45 (cylindrical member), a spacer 46 (annular member), and a motor 47.

(Driving Unit 40: Peripheral Configuration of Pulley 41)

The pulley 41 is a portion around which the belt 30 wraps. In FIG. 2, the pulley 41 has a shape corresponding to a flat belt. However, the shape of the pulley 41 may be arbitrarily selected to correspond to the shape of the belt 30. For example, when the belt 30 is a toothed belt, the pulley 41 may be a toothed pulley. In the present disclosure, the driving unit 40 includes only one pulley 41. However, the driving unit 40 may include a sub-pulley to apply an appropriate tension to the belt 30.

The shaft 42 is a member that transmits a rotational motion generated by the motor 47 to the pulley 41. The shaft 42 is fitted into the pulley 41, and rotates in the integrated form with the pulley 41.

Figure 3:
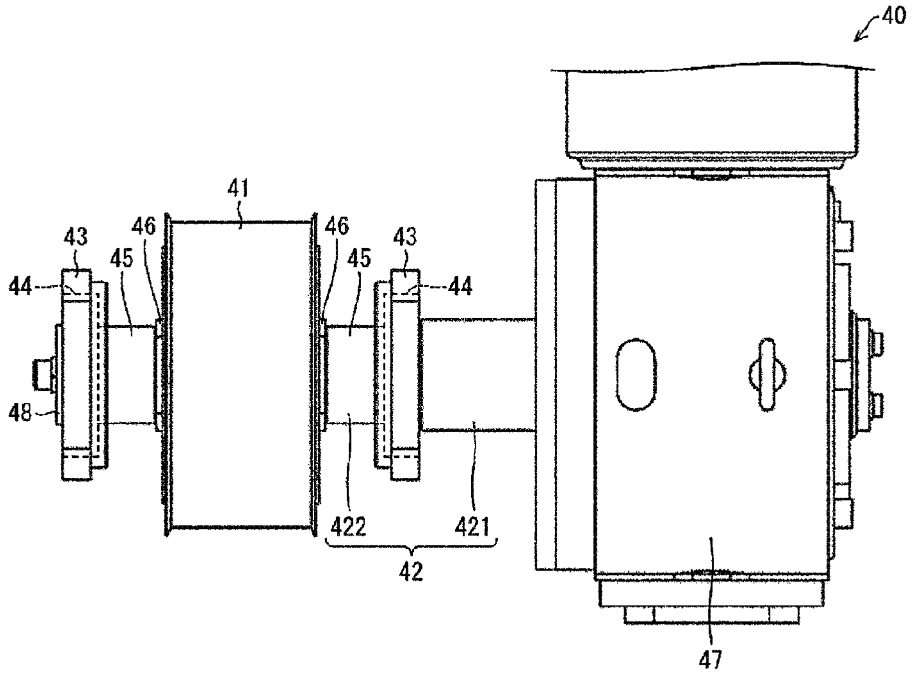
FIG. 3 is a front view of the driving unit according to an embodiment of the present disclosure.

FIG. 3 is a view of the driving unit 40 when viewed from the direction perpendicular to the axis. The shaft 42 may include a large diameter portion 421 and a small diameter portion 422 having a smaller diameter than the large diameter portion 421. At least the small diameter portion 422 is disposed to include one end of the shaft 42. The small diameter portion 422 is fitted into the pulley 41.

The flange 43 is a fixing member that fixes the driving unit 40 to a peripheral structure (not illustrated). The flange 43 is disposed at each of both sides of the pulley 41 in the axial direction of the shaft 42. In the example illustrated in FIG. 2, the flange 43 is an angular flange. Without being limited to the angular flange, the flange 43 may have any shape in accordance with the connection to the transport apparatus 1.

The bearing unit 44 is a member that rotatably holds the shaft 42 in the flange 43. The bearing unit 44 includes an outer ring and an inner ring disposed inside the outer ring and rotatable with respect to the outer ring. The inner ring is attached to the shaft 42, and the outer ring is attached to the flange 43. The bearing unit 44 may be a known bearing unit such as, for example, a ball bearing.

The driving unit 40 includes a pair of bearing units 44. The pair of bearing units 44 may be disposed in the small diameter portion 422. Specifically, the pair of bearing units 44 may be disposed on both sides of the pulley 41, respectively. For the bearing unit 44 disposed on the side of the large diameter portion 421 with respect to the pulley 41, the position thereof in the axial direction of the shaft 42 is fixed in the state where the bearing unit 44 is in contact with the large diameter portion 421. According to this configuration, the pair of bearing units 44, and the pulley 41 disposed between the bearing units 44, the collar 45, and the spacer 46 may be positioned in the small diameter portion 422 between one end of the shaft 42 and the large diameter portion 421, so that the fixing of the bearing unit 44 on the side of the motor 47 may is facilitated, and the positioning of the bearing units 44, the pulley 41, the collar 45, and the spacer 46 may be quickly performed.

The collar 45 is a cylindrical member used to position the pulley 41. The driving unit 40 includes two collars 45. The collars 45 fit around the shaft 42 between one of the pair of bearing units 44 and the pulley 41 and between the other and the pulley 41, respectively. The collars 45 may not be fixed to the shaft 42.

(Driving Unit 40: Spacer 46)

Figure 4:
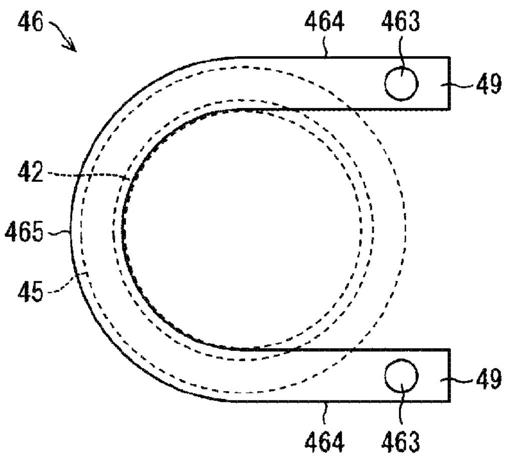
FIG. 4 is a plan view of an annular member according to an embodiment of the present disclosure.

FIG. 4 is a plan view of the spacer 46 of FIG. 3 when viewed from the axial direction. The spacer 46 is used to position the pulley 41. The spacer 46 includes ring opening portions 49 so that the spacer 46 may fit onto and be removed from the shaft 42. The spacer 46 includes an arc portion 465 having the shape following the outer periphery of the shaft 42, and a pair of extension portions 464 extending from both ends of the arc portion 465 in the tangent direction at both the ends of the arc portion 465. The ring opening portions 49 define the space between the pair of extension portions 464. The arc portion 465 may have an arc shape with a central angle of 180° or less. When the central angle of the arc portion 465 is 180°, the spacer 46 has a U shape. As for the width between the ring opening portions 49, the ring opening portions 49 are spaced apart from each other to the extent that the shaft 42 may be fitted into the spacer 46.

When the fitting work is not being performed, that is, when the shaft 42 is already mounted by being fitted into the spacer 46, the extension portions 464 are not in contact with the shaft 42. In the extension portions 464, through holes 463 are formed, through which bolts are inserted. In the pulley 41, bolt holes (not illustrated) are formed, to which the bolts inserted through the through holes 463 are screwed. The bolts inserted through the through holes 463 are screwed into the bolt holes of the pulley 41, so that the spacer 46 is fixed to the pulley 41. At this time, the through holes 463 are disposed outside the outer peripheral edge of the collar 45, to be formed at a position where the bolts and the collar 45 do not interfere with each other. The collar 45 is disposed substantially coaxially with the arc portion 465. The outer diameter of the collar 45 may be smaller than or the same as the outer diameter of the arc portion 465.

The driving unit 40 includes a pair of spacers 46. The pair of spacers 46 fit onto the shaft 42 between one of the bearing units 44 and the pulley 41 and between the other and the pulley 41, respectively. In the present embodiment, as illustrated in FIG. 3, each of the pair of spacers 46 is fitted between the pulley 41 and the collar 45. However, the pair of spacers 46 may be each fitted between each of the pair of bearing units 44 and the collar 45. In other words, each of the pair of spacers 46 may fit onto the side of the pulley 41 or on the side of the bearing unit 44 with respect to the collar 45.

In the state where the spacer 46 are absent, the total value of the lengths of the pulley 41 and the two collars 45 in the axial direction of the shaft 42 is smaller than the distance between the pair of bearing units 44. Thus, in the state where the two collars 45 are in contact with the pair of bearing units 44, respectively, a gap is formed on one side or both sides of the pulley 41. By inserting the spacers 46 into the gap, the position of the pulley 41 in the axial direction may be fixed. The total value of the lengths of the pulley 41, the collars 45, and the spacers 46 is the same as the distance between the pair of bearing units 44. In this way, the position of the pulley 41 between the pair of bearing units 44 in the axial direction of the shaft 42 is set by the collars 45 and the spacers 46.

By changing the thicknesses of the spacers 46 fitting on both sides of the pulley 41, respectively, the position of the pulley 41 in the axial direction of the shaft 42 may be changed. For example, the position of the pulley 41 may be changed to be close to the side of the motor 47, by replacing the spacer 46 on the opposite side to the motor 47 with a thicker spacer, and replacing the spacer 46 on the side of the motor 47 with a thinner spacer.

In the transport apparatus known in the related art, when changing the position of the pulley 41, the shaft 42 needs to be removed together with the motor 47 from the pulley 41 and the collars 45, and the collars 45 may be replaced with collars 45 with different lengths. Meanwhile, in the transport apparatus 1 having the configuration described above, the position of the pulley 41 may be roughly set using the collars 45, and then, the spacers 46 may be replaced with spacers 46 having different thicknesses, so that the position of the pulley 41 may be adjusted without removing the shaft 42 from the pulley 41. Thus, the work time for adjusting the position of the pulley 41 may be reduced. Further, the spacers 46 are fixed to the pulley 41 by the bolts inserted through the through holes 463, which may maintain the state where the spacers 46 fit onto the shaft 42.

The thickness of the spacer 46 in the axial direction of the shaft 42 may be smaller than the length of the collar 45 in the axial direction. That is, the length of the collar 45 in the axial direction may be greater than the thickness of the spacer 46. As a result, the spacer 46 is used as a member for finely adjusting the positioning of the pulley 41. According to the configuration described above, the thickness of the spacer 46, which is removed from the shaft 42 and replaced to adjust the position of the pulley 41, may be reduced, so that the ease of handling of the spacer 46 may be improved. However, in the transport apparatus 1, the thickness of the spacer 46 in the axial direction of the shaft 42 may not necessarily be smaller than the length of the collar 45 in the axial direction.

The spacer 46 may be fixed to the pulley 41. For example, as illustrated in FIG. 2, a portion of the ring opening portion 49 of the spacer 46 may be fixed to the pulley 41 by a bolt. In this case, the spacer 46 rotates with the pulley 41. By fixing the spacer 46, it is possible to reduce the possibility that the spacer 46 falls off due to the rotation of, for example, the shaft 42. The spacer 46 may not necessarily be fixed to the pulley 41, and may be fixed to, for example, the inner ring of the bearing unit 44 or the collar 45.

(Driving Unit 40: Other Configurations)

A fastener 48 may be attached to the end of the shaft 42 on the side of the small diameter portion 422. The fastener 48 fixes the pulley 41, the bearing units 44, the collars 45, and the spacers 46 to the shaft 42, not to be separated from one end of the shaft 42.

Further, the pulley 41, the bearing units 44, the collars 45, and the spacers 46 may be disposed in the small diameter portion 422. By arranging the members disposed in the small diameter portion 422 between the large diameter portion 421 and the fastener 48, the positioning of the members may be set, and the members may be fixed not to be separated from the shaft 42.

In the embodiment described above, the shaft 42 has the shape including the large diameter portion 421 and the small diameter portion 422, i.e., a cylindrical shape with portions having different diameters. However, the shaft 42 may have a cylindrical shape with the constant diameter. In this case, a fastener (not illustrated) may be attached to the shaft 42 to fix the bearing unit 44 on the side of the motor 47. As a result, the pulley 41 disposed between the bearing units 44, the bearing units 44, the collars 45, and the spacers 46 may be fixed at specific positions.

The motor 47 generates the power to move up and down the carriage 20. The motor 47 may be electrically controlled by any control device (not illustrated), or may be given commands including, for example, rotation speed, torque, and drive ON/OFF from an external input device (not illustrated). The motor 47 is connected to the end of the shaft 42 on the side of the large diameter portion 421. Thus, the shaft 42 and the pulley 41 rotate by the rotation of the motor 47.

(Driven Pulley 50)

Figure 5:
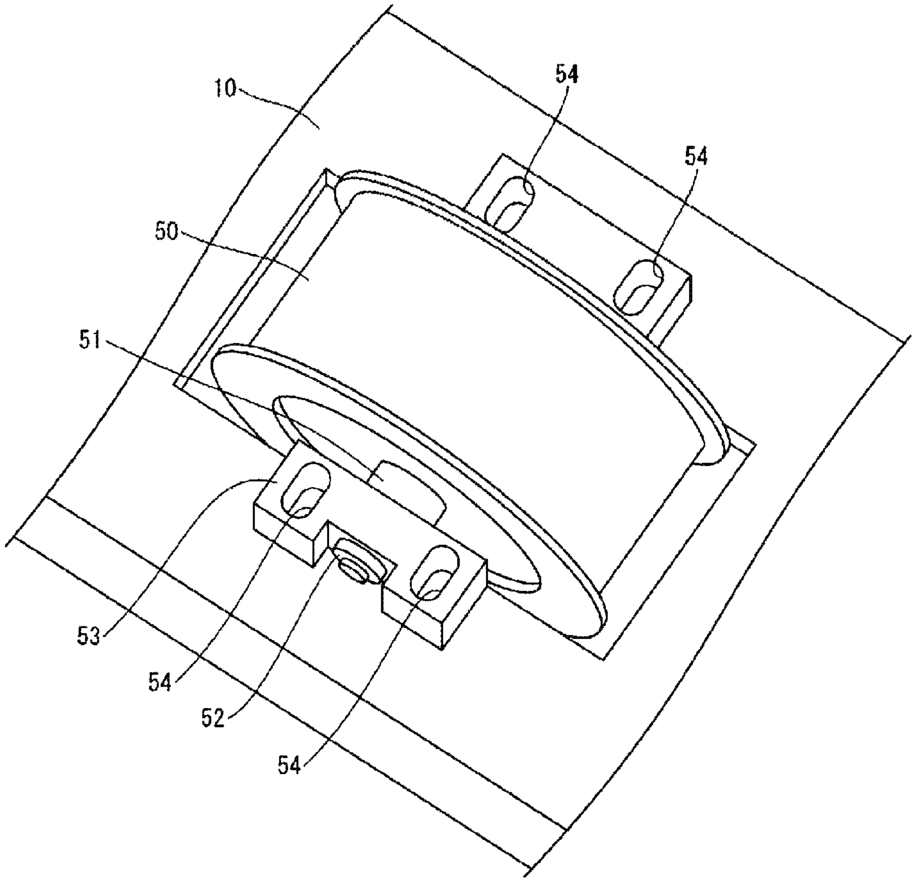
FIG. 5 is a perspective view of a driven pulley according to an embodiment of the present disclosure.

FIG. 5 is a perspective view illustrating the structure of the driven pulley 50. The driven pulley 50 is described using FIG. 5. The driven pulley 50 rotates along with the motion of the belt 30. A shaft 51 is fitted into the driven pulley 50, and the driven pulley 50 rotates around the axis of the shaft 51. The shaft 51 is rotatably supported by a bearing unit 52 and a fixing member 53.

The fixing member 53 is fixed to the upper side of the mast 10 by, for example, bolts (not illustrated). Specifically, the fixing member 53 has through holes 54 through which the bolts may be inserted. Further, in the upper side of the mast 10, thread holes (not illustrated) are formed, into which the bolts are screwed. The bolts are screwed into the thread holes in the state where the bolts are inserted into the through holes 54, so that the fixing member 53 may be fixed to the upper side of the mast 10.

With the configuration described above, the transport apparatus 1 may transport an article placed on the carriage 20 in the elevating manner. Further, the transport apparatus 1 may include a traveling cart 60, which may travel along, for example, guide rails (not illustrated) arranged above or below the transport apparatus 1. In this case, the transport apparatus 1 may transport an article along the region where the guide rails are provided.

(Method of Adjusting Transport Apparatus 1: Driving Unit)

Figure 6:
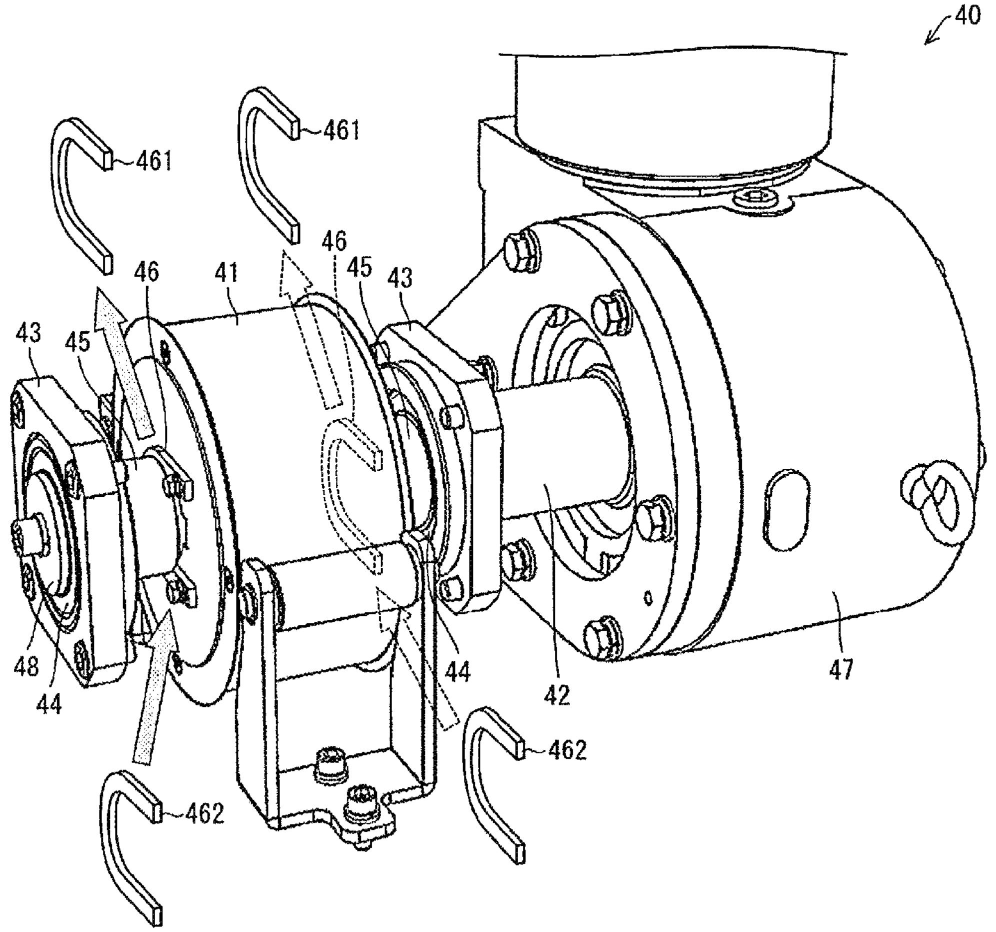
FIG. 6 is a perspective view illustrating a method of adjusting a transport apparatus according to an embodiment of the present disclosure.
Figure 7:
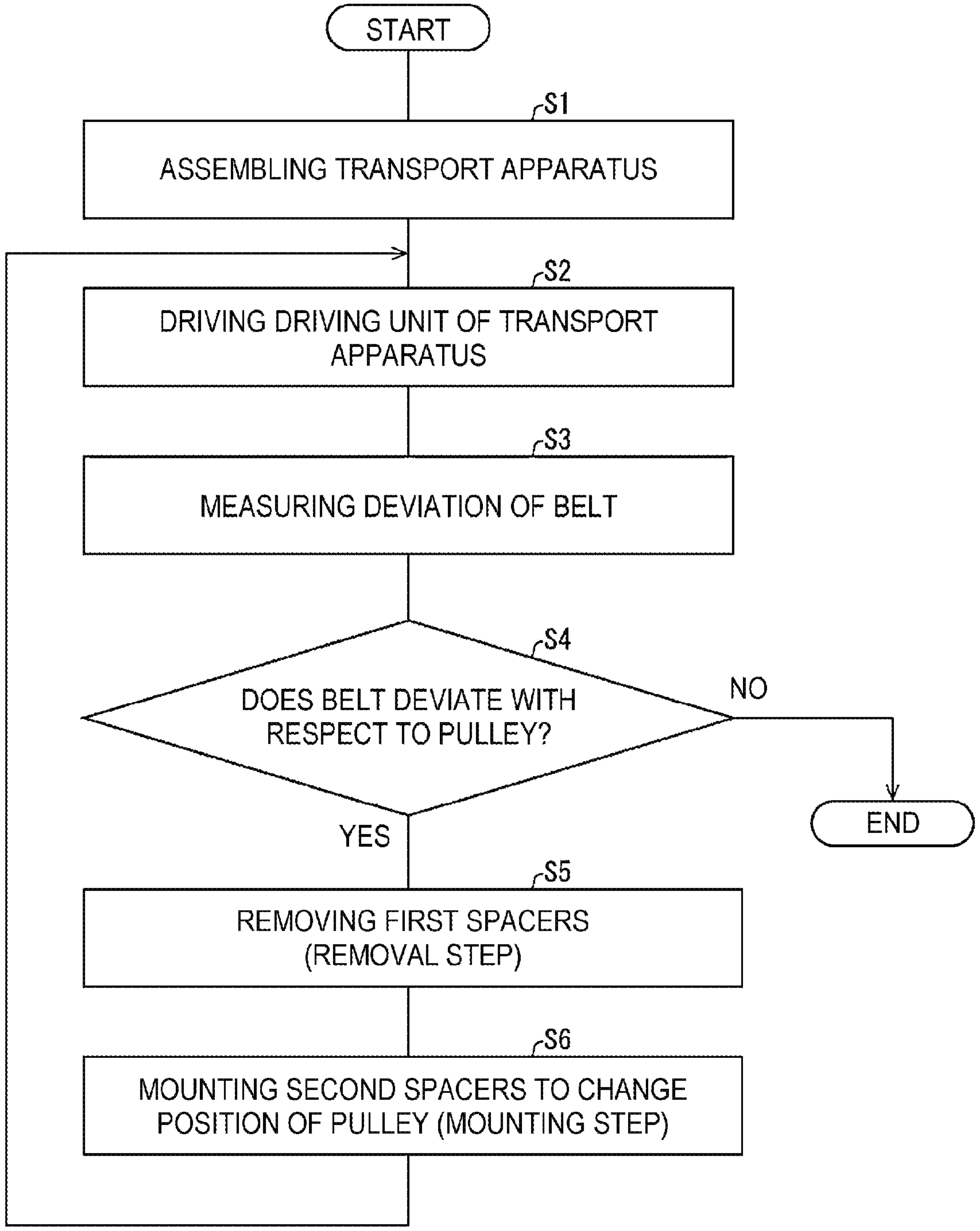
FIG. 7 is a flowchart illustrating a method of adjusting a transport apparatus according to an embodiment of the present disclosure.

FIG. 6 is a perspective view of the driving unit 40, for describing a method of replacing the spacers 46. FIG. 7 is a flowchart illustrating the method of adjusting the transport apparatus 1 at the installation location of the transport apparatus 1. The assembly method and the adjustment method of the transport apparatus 1 are described using FIGS. 6 and 7.

A first step S1 relates to the assembly of the transport apparatus 1. First, the mast 10 and the carriage 20 are positioned on the traveling cart 60. Next, the assembly and the placement of the driving unit 40 are performed. The shaft 42 is fitted into the bearing unit 44 held in one of the flanges 43. Next, the collar 45, the pulley 41, and the collar 45 fit on the shaft 42 in this order. At this time, first spacers 461 (first annular members) are fixed as the spacers 46 to both sides of the pulley 41.

Further, the shaft 42 is fitted into the bearing unit 44 held in the other of the flanges 43, and in this state, the fastener 48 is attached to the end of the shaft 42 on the side of the small diameter portion 422. The pair of flanges 43 are fixed to a structural member provided in the traveling cart 60 or the mast 10, and the motor 47 is attached to the end of the shaft 42 on the side of the large diameter portion 421.

Then, the belt 30 is suspended to wrap around the pulley 41 and the driven pulley 50 provided in the mast 10, and both ends of the belt 30 are connected to the carriage 20. At this time, the belt 30 forms an annular shape.

A second step S2 relates to driving the driving unit 40. When driving the driving unit 40, a tension is first applied to the belt 30, and then, the driving unit 40 is driven.

A third step S3 relates to measuring a deviation between the belt 30 and the pulley 41. For the measurement, the center of the width of the pulley 41 and the center of the width of the belt 30 may be measured using a ruler, or may be estimated through visual calculation of an operator.

A fourth step S4 relates to checking where a deviation occurs between the belt 30 and the pulley 41. When a deviation occurs between the belt 30 and the pulley 41 (YES), the process proceeds to a fifth step. When no deviation occurs (NO), the adjustment method is terminated (END). The determination of the deviation may be performed according to, for example, whether the center of the width of the pulley 41 and the center of the width of the belt 30 are aligned, or aligned within a certain allowable range.

A fifth step S5 relates to removing the first spacers 461 (removal step). As illustrated in FIG. 6, the first spacers 461 are removed from the shaft 42 by releasing the fixing of the first spacers 461. At this time, since the region corresponding to the length of the collar is secured as the work space for removing the bolts, the bolts may be removed. In this step, the pulley 41 and the collars 45 do not need to be removed from the shaft 42. Further, at this time, the tension applied to the belt 30 may be removed such that the belt 30 is bent.

A sixth step S6 relates to a process of inserting second spacers 462 (second annular members) as the spacers 46 (insertion step). The thickness of the first spacer 461 and the thickness of the second spacer 462 are different from each other. The second spacers 462 are selected such that the pulley 41 is appropriately positioned in the axial direction of the shaft 42 to correct the deviation of the belt 30 occurring in the fourth step, and then, are inserted in place of the first spacers 461 as illustrated in FIG. 6.

For example, it may be assumed that when first spacers 461 each having a thickness of 3 mm are used on both sides of the pulley 41, respectively, the position of the belt 30 relative to the position of the pulley 41 deviates by 2 mm toward the motor 47. In this case, in the sixth step, a second spacer 462 with a thickness of 5 mm fits on the side of the pulley 41 opposite to the motor 47, and a second spacer 462 with a thickness of 1 mm fits on the side of the pulley 41 close to the motor 47. Therefore, as compared to the second step, the pulley 41 may be moved by 2 mm toward the side of the motor 47. Further, when the tension applied to the belt 30 is removed in advance in the fifth step so that the belt 30 is bent, no load occurs between the pulley 41 and the shaft 42, which may facilitate the movement of the pulley 41 in the axial direction.

As described above, the shaft 42 do not need to be removed from the pulley 41 during the second to sixth steps. Therefore, by removing the first spacers 461 from the shaft 42 and fitting the second spacers 462 on the shaft 42, the position of the pulley 41 in the transport apparatus 1 may be adjusted to match the position of the belt 30 without removing the shaft 42 from the pulley 41.

The adjustment method of the present disclosure is also advantageous when the belt 30 is replaced, in addition to when the transport apparatus 1 is assembled. In this case, instead of the first step S1, a process of replacing and attaching the belt 30 is performed. In the process of replacing and attaching the belt 30, the tension of the belt 30 is released, and the belt 30 and the carriage 20 are disconnected. The existing belt 30 is removed, a new belt 30 is suspended to wrap around the pulley 41 and the driven pulley 50 provided in the mast 10, and both sides of the belt 30 are connected to the carriage 20. At this time, the belt 30 forms an annular shape. Then, a tension is applied to the belt 30 in the state where the shaft 42 passes through the inside of the belt 30.

(Method of Adjusting Transport Apparatus 1: Driven Pulley)

In the transport apparatus 1, the position of the driven pulley 50 in the axial direction of the shaft 51 may also be adjusted. For example, similar to the pulley 41 of the driving unit 40, the driven pulley 50 may also have the configuration where spacers having the same shape as the spacers 46 fit onto both sides thereof in the axial direction of the shaft 51. In this case, the position of the driven pulley 50 may be adjusted by replacing the spacers.

Further, since no motor is connected to the rotation axis of the driven pulley 50, the position of the driven pulley 5 may be adjusted in the direction of the rotation axis with the simpler configuration than that of the pulley 41 of the driving unit 40. Specifically, as illustrated in FIG. 5, each through hole 54 may have an elongated hole shape of which longitudinal direction follows the axial direction of the shaft 51. In this case, the position of the driven pulley 50 may be finely adjusted along the longitudinal direction of the through holes 54.

With this configuration, in the driven pulley 50, the deviation of the belt 30 may be corrected using the simpler method than that in the pulley 41.

SUMMARY

A first aspect of the present disclosure provides a transport apparatus including: a support; an elevating base supported in the support to be movable up and down; a belt that is stretched from the elevating base and moves the elevating base up and down; a pulley around which the belt wraps; a shaft fitting into the pulley; fixing flanges disposed on both sides of the pulley in an axial direction of the shaft; a pair of bearing units that rotatably hold the shaft in the fixing flanges; cylindrical collars fitting around the shaft, and disposed between one of the pair of bearing units and the pulley and between a remaining of the pair of bearing units and the pulley, respectively; and annular spacers each including ring opening portions to fit onto and be removed from the shaft, and fitting onto the shaft between one of the pair of bearing units and the pulley and between a remaining of the pair of bearing units and the pulley, respectively. The position of the pulley between the pair of bearing units in the axial direction of the shaft is adjusted by the cylindrical collars and the annular spacers.

According to a second aspect of the present disclosure, in the transport apparatus of the first aspect, a length of each of the cylindrical collars in the axial direction of the shaft may be larger than a thickness of each of the annular spacers in the axial direction.

According to a third aspect of the present disclosure, in the transport apparatus of the first or second aspect, the annular spacers may be fixed to the pulley.

According to a fourth aspect of the present disclosure, in the transport apparatus of any one of the first to third aspects, the shaft may include a large diameter portion and a small diameter portion with a smaller diameter than the large diameter portion. The small diameter portion may include one end of the shaft. The pair of bearing units, the pulley, the fixing flange, and the annular spacers may be disposed in the small diameter portion.

A fifth aspect of the present disclosure provides a method of adjusting a transport apparatus including: a support; an elevating base supported in the support to be movable up and down; a belt that is stretched from the elevating base and moves the elevating base up and down; a pulley around which the belt wraps; a shaft fitting into the pulley; fixing flanges disposed on both sides of the pulley in an axial direction of the shaft; a pair of bearing units that rotatably hold the shaft in the fixing flanges; cylindrical collars fitting around the shaft, and disposed between one of the pair of bearing units and the pulley and between a remaining of the pair of bearing units and the pulley, respectively; and annular spacers each including ring opening portions to fit onto and be removed from the shaft, and fitting onto the shaft between one of the pair of bearing units and the pulley and between a remaining of the pair of bearing units and the pulley, respectively. The method includes: removing first annular spacers as the annular spacers from the shaft, without removing the pulley and the cylindrical collars from the shaft; and fitting second annular spacers with a different thickness from that of the first annular spacers, as the annular spacers, in place of the first annular spacers.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A transport apparatus comprising:
a support;
an elevating base supported in the support to be movable up and down;
a belt stretched from the elevating base and configured to move the elevating base up and down;
a pulley wrapped with the belt;
a shaft fitting into the pulley;
a fixing flange disposed on each side of the pulley in an axial direction of the shaft;
a pair of bearings configured to rotatably hold the shaft in the fixing flange;
a cylindrical collar fitting around the shaft, between each of the pair of bearings and the pulley; and
an annular spacer including a ring portion to fit onto and be removed from the shaft, and fitting around the shaft, between each of the pair of bearings and the pulley,
wherein a position of the pulley between the pair of bearings in the axial direction of the shaft is determined by the cylindrical collar and the annular spacer.

2. The transport apparatus according to claim 1, wherein a length of the cylindrical collar in the axial direction of the shaft is larger than a thickness of the annular spacer in the axial direction.

3. The transport apparatus according to claim 1, wherein the annular spacer is fixed to the pulley.

4. The transport apparatus according to claim 1, wherein the shaft includes a large diameter portion and a small diameter portion with a smaller diameter than the large diameter portion,
the small diameter portion includes one end of the shaft, and
the pair of bearings, the pulley, the fixing flange, and the annular spacer are disposed in the small diameter portion.

5. A method of adjusting a transport apparatus including:
a support;
an elevating base supported in the support to be movable up and down;
a belt stretched from the elevating base and configured to move the elevating base up and down;
a pulley wrapped with the belt;
a shaft fitting into the pulley;

a fixing flange disposed on each side of the pulley in an axial direction of the shaft;

a pair of bearings configured to rotatably hold the shaft in the fixing flange;

a cylindrical collar fitting around the shaft, between each of the pair of bearings and the pulley; and an annular spacer including a ring opening portion to fit onto and be removed from the shaft, and fitting around the shaft, between each of the pair of bearings and the pulley, the method comprising:

removing a first annular spacer serving as the annular spacer from the shaft, without removing the pulley and the cylindrical collar from the shaft; and fitting a second annular spacer, serving as the annular spacer and with a different thickness from the first annular spacer, in place of the first annular spacer.

* * * * *